US010757283B2

(12) United States Patent
Hashimoto

(10) Patent No.: US 10,757,283 B2
(45) Date of Patent: Aug. 25, 2020

(54) INFORMATION PROCESSING APPARATUS AND CONTROL METHOD OF THE INFORMATION PROCESSING APPARATUS WITH A CONVERTER SUPPLYING POWER WHEN A PFC CIRCUIT IS OFF

(71) Applicant: CANON KABUSHIKI KAISHA, Tokyo (JP)

(72) Inventor: Minoru Hashimoto, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/794,615

(22) Filed: Oct. 26, 2017

(65) Prior Publication Data

US 2018/0131830 A1 May 10, 2018

(30) Foreign Application Priority Data

Nov. 8, 2016 (JP) ................................ 2016-217978

(51) Int. Cl.
H04N 1/00 (2006.01)
H02M 1/42 (2007.01)

(52) U.S. Cl.
CPC ...... H04N 1/00896 (2013.01); H02M 1/4208 (2013.01); H04N 1/00891 (2013.01); H04N 1/00904 (2013.01); H04N 1/00994 (2013.01); H04N 2201/0094 (2013.01)

(58) Field of Classification Search
CPC .................................................. H04N 1/00904
See application file for complete search history.

(56) References Cited

U.S. PATENT DOCUMENTS

| 8,351,813 B2 | 1/2013 | Hashimoto |
| 2004/0146313 A1 | 7/2004 | Uchizono et al. |
| 2004/0174152 A1* | 9/2004 | Hwang ............... H02M 1/4225 323/284 |
| 2008/0155286 A1* | 6/2008 | Hirai ..................... G06F 1/3203 713/320 |
| 2009/0010671 A1 | 1/2009 | Hashimoto |
| 2010/0246229 A1 | 9/2010 | Lu |
| 2012/0001599 A1* | 1/2012 | Tanaka .................... H02M 1/10 323/205 |
| 2012/0287467 A1 | 11/2012 | Yamano |

(Continued)

FOREIGN PATENT DOCUMENTS

| JP | H10-285310 A | 10/1998 |
| JP | 2007-090830 A | 4/2007 |

(Continued)

OTHER PUBLICATIONS

Extended Search Report in European Patent Application No. 17 00 1738, dated Jun. 14, 2018.

(Continued)

Primary Examiner — King Y Poon
Assistant Examiner — Michael Burleson
(74) Attorney, Agent, or Firm — Venable LLP

(57) ABSTRACT

The information processing apparatus according to an embodiment of the present invention includes a power factor correction (PFC) circuit, an interface capable of connecting an optional device, and a power controller capable of turning off the PFC circuit. The power controller does not turn off the PFC circuit while a predetermined optional device is connected to the interface.

19 Claims, 12 Drawing Sheets

(56) References Cited

U.S. PATENT DOCUMENTS

2013/0083338 A1\* 4/2013 Fahrenkrug ........... G06F 3/1221
358/1.13
2013/0209132 A1 8/2013 Soda

FOREIGN PATENT DOCUMENTS

| JP | 2007-090832 A | 4/2007 |
| JP | 2014-142818 A | 8/2014 |
| JP | 2016-103748 A | 6/2016 |

OTHER PUBLICATIONS

Jul. 14, 2020 Office Action in Japanese Patent Application No. 2016-217978 (with English translation).

\* cited by examiner

INFORMATION PROCESSING APPARATUS AND CONTROL METHOD OF THE INFORMATION PROCESSING APPARATUS WITH A CONVERTER SUPPLYING POWER WHEN A PFC CIRCUIT IS OFF

BACKGROUND OF THE INVENTION

Field of the Invention

The present invention relates to a control technique of an apparatus capable of operating in a power-saving mode.

Description of the Related Art

Conventionally, an apparatus, such as a multi function printer, having a plurality of functions of copying, printing, scanning, faxing, and so on operates by switching between a normal power mode and a power-saving mode in which the apparatus operates on power smaller than that in the normal power mode. The apparatus such as this consumes large power, such as 1 kW (kilowatt), at the time of printing in the normal power mode, but in the power-saving mode, power consumption is reduced to tens of W (watt) or low at the maximum.

In order to reduce power consumption, in the power-saving mode, the operation of a power factor correction (PFC) circuit within a power source unit is also suspended and the power consumption of the PFC circuit is reduced. The PFC circuit is a circuit that improves a power factor by putting the current waveform of an alternating-current power source, which is input to the power source unit, close to a voltage waveform by shaping the disturbance in the current waveform. By the PFC circuit, the occurrence of noise trouble is prevented by reducing harmonic components that occur on the power source line and the efficiency of power consumption is improved. In the power-saving mode, the power that is supplied is small and there is almost no bad effect due to the harmonic components, and therefore, the operation of the PFC circuit is suspended. By suspending the operation of the PFC circuit, it is possible to reduce power consumption by about 2W.

For example, Japanese Patent Laid-Open No. 2007-090830 has disclosed a technique to suspend the operation of the PFC circuit at the time of a printing apparatus transiting to the power-saving mode.

However, even in the power-saving mode, the power supplied by the power source unit changes depending on the configuration of peripheral devices to which the power is supplied from the power source unit of the apparatus. For example, mention is made of the case where an optional peripheral device is added to the apparatus, the case where a peripheral device is attached to an interface (hereinafter, I/F), such as USB, and so on.

Consequently, in the case where the operation of the PFC circuit is suspended in such a situation, a bad effect or the like due to the harmonic components appears remarkably, and therefore, it is recommended to cause the PFC circuit to operate rather than suspending the operation of the PFC circuit. On the other hand, in the case where the PFC circuit is caused to operate at all times in the power-saving mode, as described above, due to the power consumption by the PFC circuit itself, the power consumption in the power-saving mode becomes large.

SUMMARY OF THE INVENTION

The information processing apparatus according to an embodiment of the present invention includes a power factor correction (PFC) circuit, an interface capable of connecting an optional device, and a power controller capable of turning off the PFC circuit. The power controller does not turn off the PFC circuit while a predetermined optional device is connected to the interface.

Further features of the present invention will become apparent from the following description of exemplary embodiments with reference to the attached drawings.

DESCRIPTION OF THE EMBODIMENTS

In the following, embodiments for performing the present invention are explained in detail with reference to the drawings. Throughout the drawings, the same symbol indicates the same component.

First Embodiment

Figure 1:
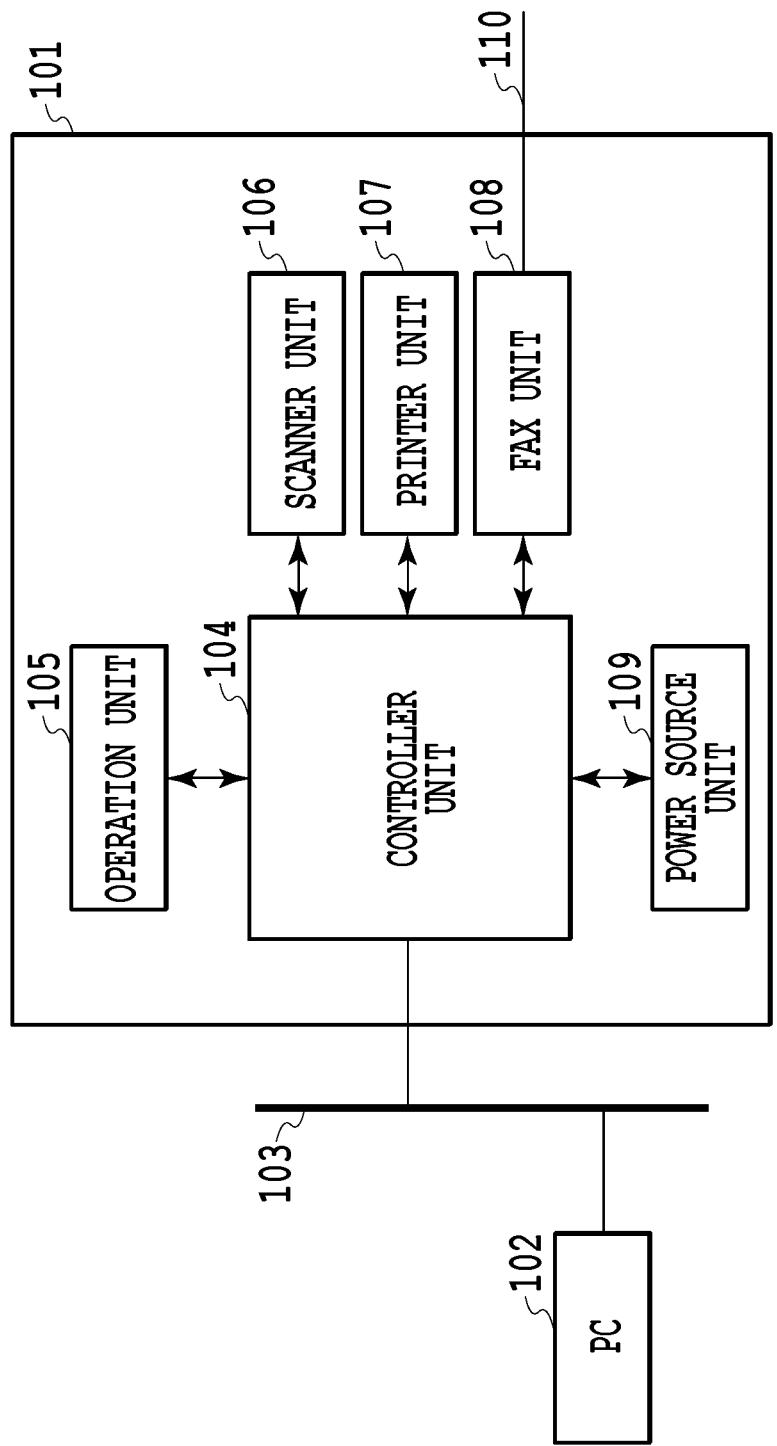
FIG. 1 is a diagram showing a system configuration including a multi function printer in a first embodiment.

FIG. 1 shows a system configuration example including a multi function printer in the present embodiment.

In FIG. 1, a multi function printer 101 is connected to a PC (Personal Computer) 102 via a network 103. It is possible for the PC 102 to transmit and receive data to and from the multi function printer 101. For example, it is possible for the PC 102 to transmit data, such as a print job, to the multi function printer 101 via the network 103, to change settings of the multi function printer 101, and so on in accordance with instructions of a user.

The multi function printer 101 includes a controller unit 104, an operation unit 105, a scanner unit 106, a printer unit 107, a fax unit 108, and a power source unit 109. Because the multi function printer 101 includes peripheral devices, such as the scanner unit 106, the printer unit 107, and the fax unit 108, the functions as a copy machine, a printer, a scanner, a fax, and so on are integrated and a composite function is provided. However, it is not necessarily required for the peripheral devices that implement all these functions to be integrated as a standard configuration and for example, it may also be possible to design a configuration so that the fax unit 108 can be attached as an option later in place of the standard configuration in which the fax unit 108 is integrated. That is, it may also be possible to make up the fax unit 108 as a device that can be attached and detached.

The operation unit 105 includes switches for a user to perform various operations, an operation panel, and a display unit configured to display operation information. The display unit may be made up of a touch screen display that functions as an operation panel.

The scanner unit 106 includes a mechanism to generate image data by scanning a document and to input the image data to the controller unit 104.

The printer unit 107 prints and outputs image data processed by the controller unit 104 onto a printing medium, such as a sheet.

The fax unit 108 is connected with a telephone line 110 and transmits a document read by the scanner unit 106 by fax, receives fax data via the telephone line 110, and so on. The received fax data can be printed and output by the printer unit 107.

The power source unit 109 converts a commercial alternating-current power source into a direct-current power source and supplies power to each unit within the multi function printer 101.

Figure 2:
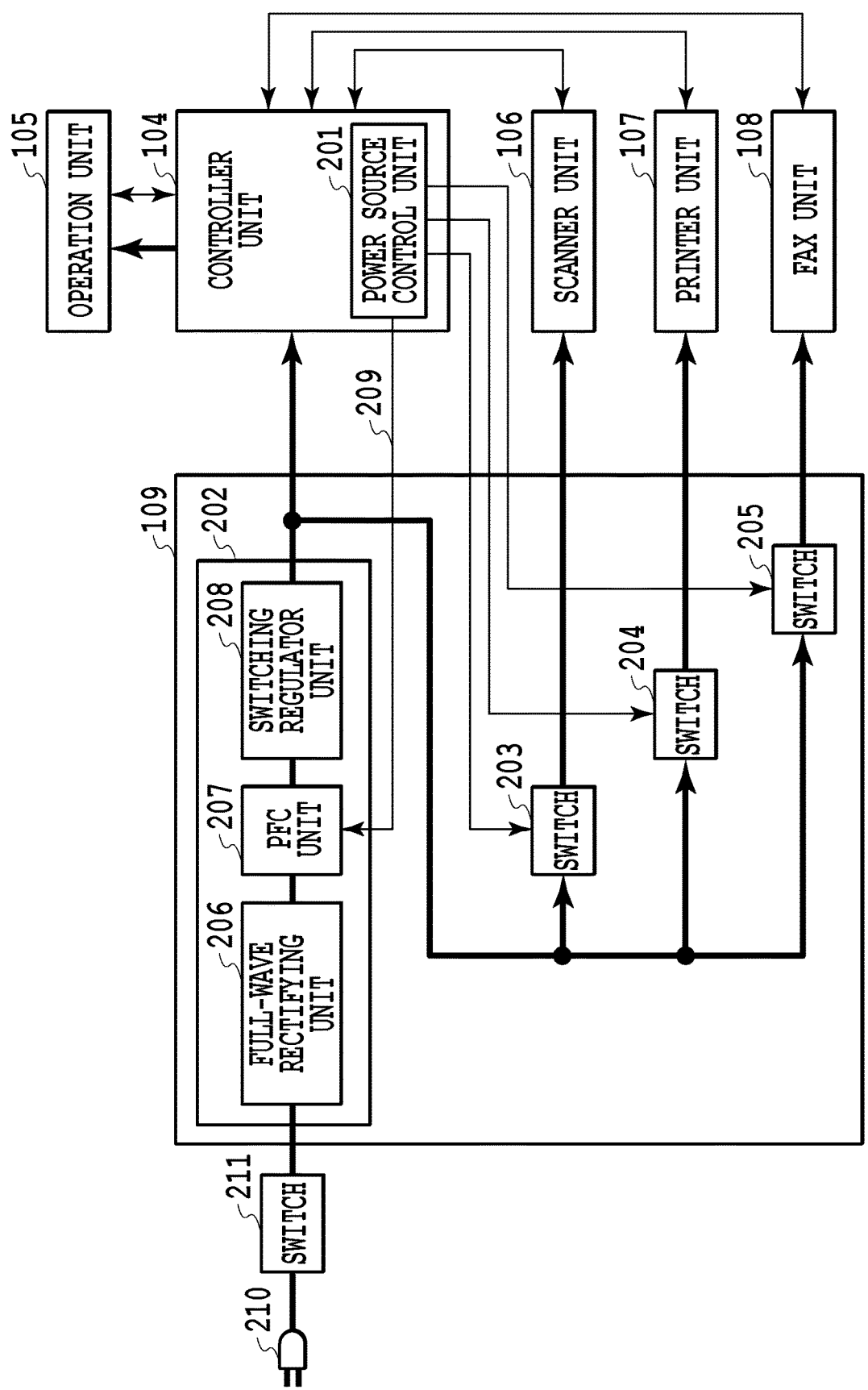
FIG. 2 is a block diagram mainly showing a configuration of a power source unit in the multi function printer of the first embodiment.

FIG. 2 is a block diagram mainly showing a configuration of the power source unit 109 in the multi function printer 101 of the present embodiment. In FIG. 2, the thick line indicates a power source supply path and the thin line indicates a control signal path by the controller unit 104 or a power source control unit 201.

In the case where a power source switch 211 of the multi function printer 101 is turned on by a user, the commercial alternating-current power source is supplied to a power source unit 202 within the power source unit 109 from a power source plug 210. The power source unit 202 generates a direct-current power source from the alternating-current power source and supplies the generated direct-current power source to the controller unit 104 and to the operation unit 105 via the controller unit 104. Further, the direct-current power source generated by the power source unit 202 is supplied to the scanner unit 106, the printer unit 107, and the fax unit 108, respectively, via switches 203, 204, and 205. The switches 203, 204, and 205 are controlled to turn on and off by the power source control unit 201 within the controller unit 104. It is possible to perform fine power control by the power source control unit 201 switching each switch in accordance with the operation of the entire multi function printer 101.

At the time of the multi function printer 101 transiting from the normal power mode to the power-saving mode in which power consumption is reduced, by the power source control unit 201 turning off the switches 203 and 204, the power source supply to the scanner unit 106 and the printer unit 107 is suspended. On the other hand, as to the fax unit 108, the switch 205 remains on also in the power-saving mode, and therefore, the power source is supplied. The reason is to supply power to a unit that is necessary to detect an incoming call from the telephone line 110. In the case where incoming call detection is not necessary, it may also be possible to turn off the switch 205 to suspend the power source supply to the fax unit 108.

The power source unit 202 includes a full-wave rectifying unit 206 configured to full-wave rectify an alternating-current power source, a PFC unit 207 configured to improve a power factor of the full-wave rectified alternating-current power source, and a switching regulator unit 208 configured to convert an output from the PFC unit 207 into a desired voltage. The PFC unit 207 is a PFC circuit that improves a power factor by putting the current waveform of the alternating-current power source that is input close to the voltage waveform by shaping the disturbance in the current waveform. Due to this, it is possible to prevent noise trouble from occurring and to improve the efficiency of power consumption by reducing the harmonic components that occur on the power source line.

The PFC unit 207 can switch on/off of the PFC operation by a PFC control signal 209 that is input from the power source control unit 201 of the controller unit 104. Specifically, in the normal power mode in which power consumption is large, the PFC operation is turned on and on the other hand, in the power-saving mode in which power consumption is small and it is desired to eliminate a loss due to the PFC operation, the PFC operation is turned off because power is small and there is almost no bad effect due to the harmonic components. However, in the case where there is a possibility that the power consumption in the state where the PFC operation is turned off in the power-saving mode exceeds a predetermined value, the PFC operation is turned on as an exception. Whether or not there is a possibility that the power consumption exceeds a predetermined value is determined by the power source control unit monitoring the state of the apparatus.

Figure 3:
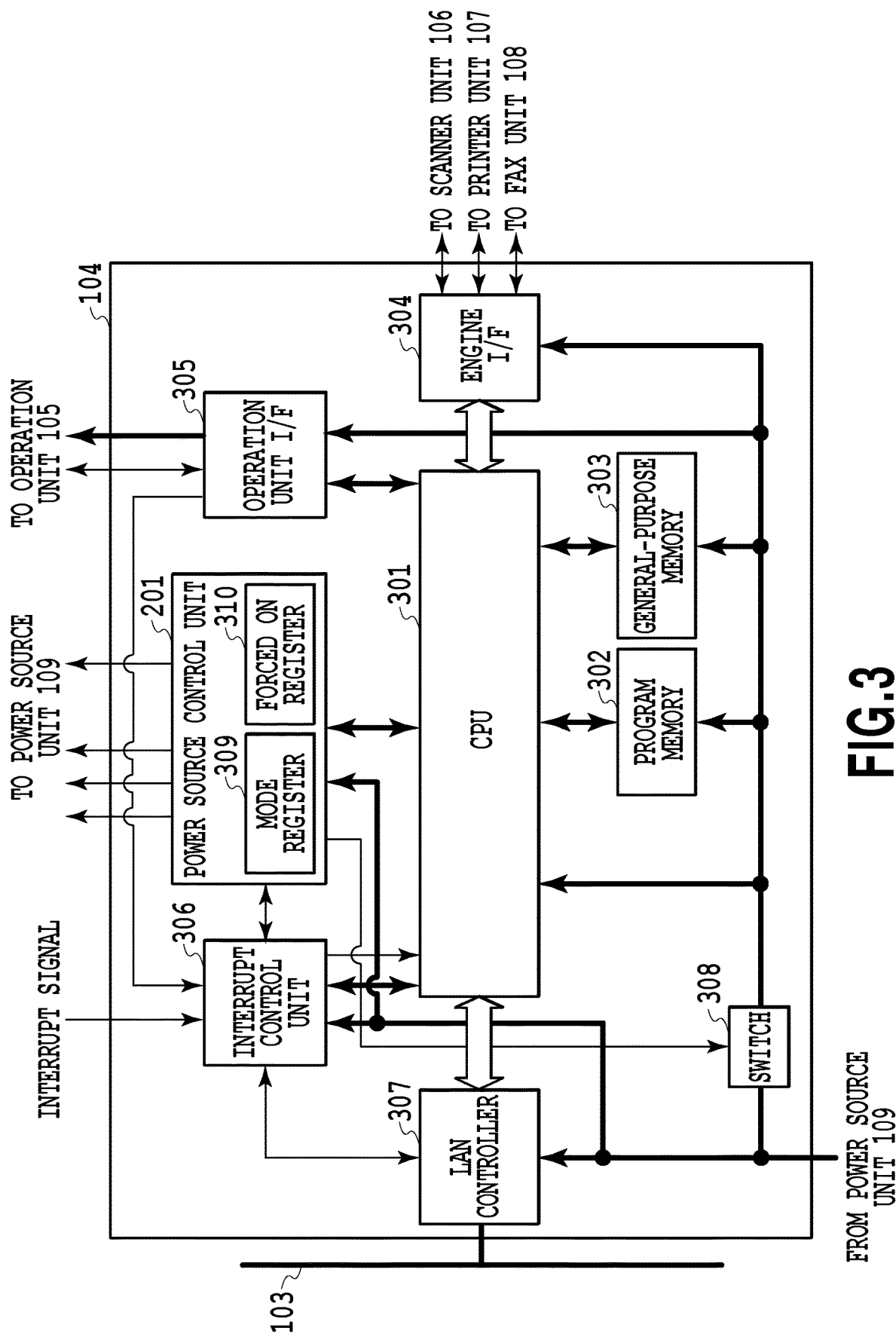
FIG. 3 is a block diagram showing a configuration of a controller unit in the multi function printer of the first embodiment.

FIG. 3 is a block diagram showing a configuration of the controller unit 104 in the multi function printer 101 of the present embodiment.

The controller unit 104 includes a CPU 301, a program memory 302, a general-purpose memory 303, an engine I/F 304, an operation unit I/F 305, an interrupt control unit 306, a LAN controller 307, the power source control unit 201, and a switch 308.

The CPU 301 is connected to the engine I/F 304 and the LAN controller 307 by a PCI Express bus. Further, the CPU 301 includes an interface circuit with various peripheral devices, and executes programs stored in the program memory 302 and controls the entire the multi function printer 101.

The program memory 302 stores programs and control data to control the multi function printer 101.

The general-purpose memory 303 is used as a work memory of the CPU 301 and stores image data and the like in accordance with each target unit in accordance with each piece of processing of copying, scanning, printing, faxing, and so on.

The engine I/F 304 connects the CPU 301 with the scanner unit 106, the printer unit 107, and the fax unit 108 and performs communication control and transmission and reception of image data.

The operation unit I/F 305 is an interface to connect the CPU 301 and the operation unit 105, and communicates operation information on a key, a touch panel, and so on of the operation unit 105 and transmits image data to be displayed on the operation unit 105.

The interrupt control unit 306 detects an interrupt signal and notifies the power source control unit 201 and the CPU 301 of the interrupt in accordance with the interrupt factor. The interrupt signal includes, for example, a signal that is input from the operation unit 105 via the operation unit I/F 305, a signal from an external device connected to the network 103 via the LAN controller 307, and an interrupt signal from each unit within the apparatus.

The LAN controller 307 is a network control unit connected to the network 103 and configured to perform network communication with an external device.

The switch 308 is a switch that is turned off by a control signal from the power source control unit 201 at the time of the multi function printer 101 transiting to the power-saving mode so that the power supply from the power source unit 202 can be shut off. By turning off the switch 308, it is possible to shut off the power source of the CPU 301, the program memory 302, the general-purpose memory 303, the engine I/F 304, the operation unit I/F 305, and the operation unit 105. At this time, the CPU 301 saves various kinds of data stored by the CPU 301 in the general-purpose memory 303 and transits the general-purpose memory 303 into a self refresh state. By doing so, it is possible to store data in a state where the power consumption is smaller than that in the state where the CPU 301 stores information.

Further, the CPU 301 sets a value of the power mode, which indicates the power state, in accordance with the power source control program within the program memory 302 to a mode register 309 within the power source control unit 201. In the present embodiment, the value of the mode register 309 indicates one of the normal power mode and the power-saving mode. The power source control unit 201 controls on/off of the switches 203, 204, 205, and 308 in accordance with the value of the mode register 309.

Further, the CPU 301 sets and stores operation information indicating whether or not to cause the PFC unit 207 to operate to a forced ON register 310 within the power source control unit 201 in accordance with whether or not the fax unit 108, which is optional, is installed at the time of initialization of the apparatus. The PFC control signal 209 that is output to the PFC unit 207 from the power source control unit 201 is determined based on the value of the mode register 309 and the value of the forced ON register 310.

In this manner, the controller unit 104 also functions as a control device that controls the operation of the PFC unit 207.

Figure 4:
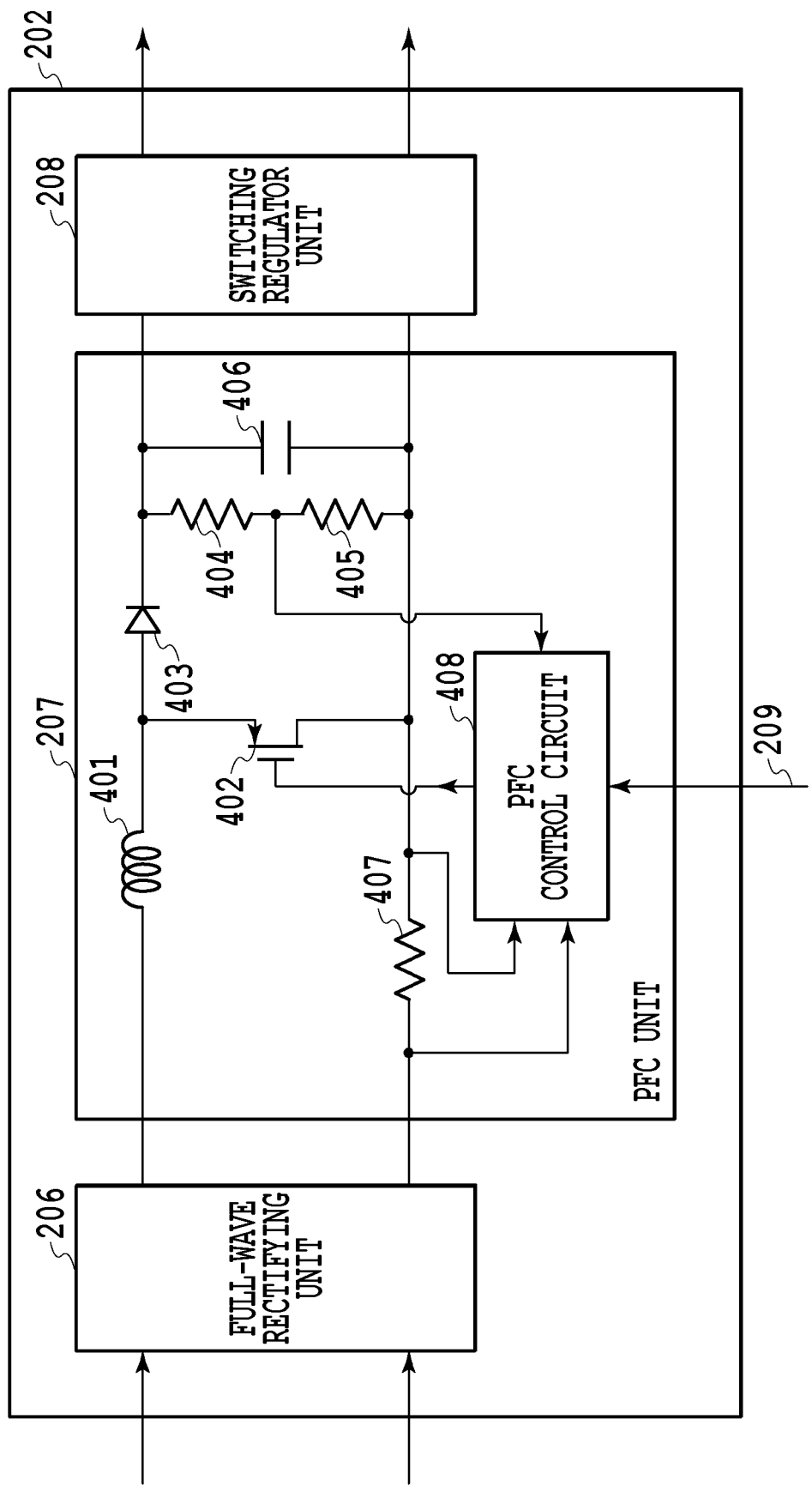
FIG. 4 is a block diagram showing an internal structure of a power source unit in the multi function printer of the first embodiment.

FIG. 4 is a block diagram showing an internal structure of the power source unit 202 in the multi function printer 101 of the present embodiment. The power source unit 202 includes the full-wave rectifying unit 206, the PFC unit 207, and the switching regulator 208 as described previously with reference to FIG. 2. In the following, the structure of the PFC unit 207 is explained in detail in particular.

In the power source unit 202, in the case where an alternating-current power source is supplied to the full-wave rectifying unit 206, a rectified pulsating voltage waveform current is input to the PFC unit 207. A PFC control circuit 408 within the PFC unit 207 controls on/off of an FET (Field Effect Transistor) 402 so that the current waveform synchronizes with the voltage waveform. In the case where the FET 402 is on, power is accumulated in a choke coil 401 and in the case where the FET 402 is off, the power accumulated in the choke coil 401 is supplied to a primary smoothing capacitor 406 via a diode 403. By controlling the FET 402 as described above, it is possible to adjust the current waveform. The PFC control circuit 408 controls the FET 402 by monitoring the voltage value of the voltage into which divided by voltage dividing resistors 404 and 405 and the current value of the current that flows through a resistor 407. In the case where the PFC control signal 209 from the power source control unit 201 is on, on/off of the FET 402 is controlled, but in the case where the PFC control signal 209 is off, the FET 402 turns off. As described above, by turning off the FET 402, the operation of the PFC unit 207 suspends and a state is entered where the power factor is not improved.

Figure 5:
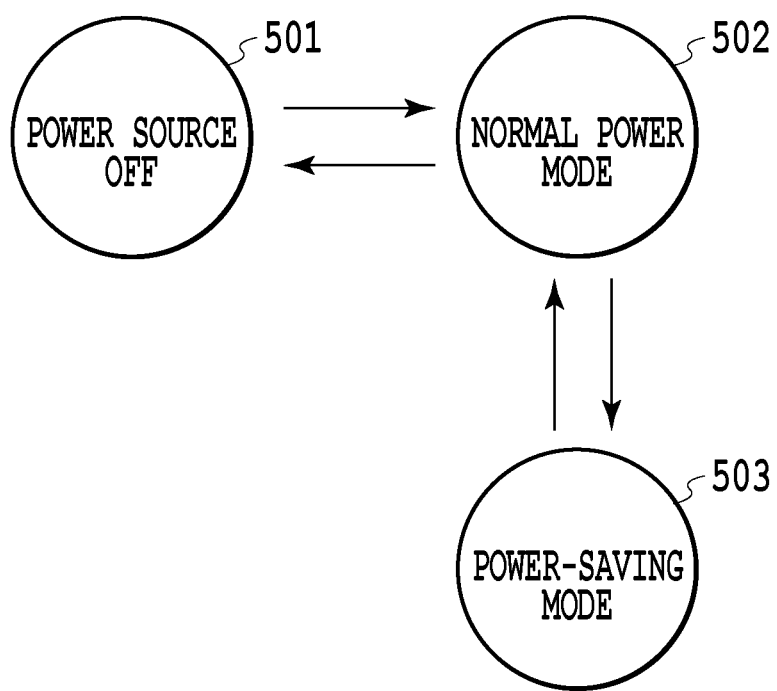
FIG. 5 is a state transition diagram of power modes of the multi function printer in the first embodiment.

FIG. 5 is a state transition diagram of power modes of the multi function printer 101 in the present embodiment. The multi function printer 101 in the present embodiment includes states of power source off, normal power mode, and power-saving mode.

The state of power source off 501 is a state where the power source switch 211 of the multi function printer 101 is turned off and power source supply to each unit is shut off.

In the case where the power source switch 211 is turned on in the state of the power source off 501, the power mode transits to a normal power mode 502. The normal power mode 502 is a state where a power source is supplied to the inside of the multi function printer 101 and various jobs, such as copying, printing, and faxing, are performed, or a state where the jobs can be performed. The transition of the power state of the multi function printer 101 in the normal power mode 502 is implemented by the CPU 301 controlling the power source control unit 201 in accordance with a power source control program within the program memory 302. As conditions of the transition from the normal power mode 502 into a power-saving mode 503, mention is made of, for example, completion of a job, such as copying, scanning, printing, and faxing, or an elapse of a predetermined time from the last operation at the operation unit 105. Further, it may also be possible for a user to set the transition by explicitly giving instructions to transit to the power-saving mode via the operation unit 105. For example, it may also be possible to transit to the power-saving mode by a user pressing down a power-saving switch of the operation unit 105.

The power-saving mode 503 is a state where the switches 203 and 204 of the power source unit 109 and the switch 308 of the controller unit 104 are turned off and a power source is supplied only to part of the controller unit 104. Specifically, a power source is supplied only to the general-purpose memory 303, the operation unit I/F 305, the power source control unit 201, the interrupt control unit 306, the LAN controller 307, and the fax unit 108 in FIG. 3. Further, the general-purpose memory 303 transits to a self refresh mode and power consumption is reduced.

Interrupt factors to resume the normal power mode 502 from the power-saving mode 503 are shown in Table 1. As shown in Table 1, the interrupt factors include "Operation unit switch pressed down", "Job reception", "Time setting", and "Fax job detection". "Operation unit switch pressed down" means that a power-saving cancel switch of the operation unit is pressed down and the power-saving state is cancelled. "Job reception" means that a print job or the like is received via a LAN. "Time setting" means that a preset time is reached and the normal power mode is resumed. "Fax job detection" means that there is an incoming call of a fax job to the fax unit 108 via a telephone line. In the case where these interrupt factors occur, the interrupt control unit 306 notifies the power source control unit 201 and the CPU 301 of this. Upon receipt of notification, the CPU 301 changes the power state of the multi function printer 101 and resumes the normal power mode 502 by determining which interrupt factor causes the resumption and by performing power source resumption control after activation.

TABLE 1

| Interrupt factor | Description |
| --- | --- |
| Operation unit switch pressed down | Power-saving cancel switch of operation unit is pressed down |
| Job reception | Print job or the like is received from LAN |
| Time setting | Set time is reached |
| Fax job detection | There is incoming call to fax unit via telephone line |

Following the above, the control method of a PFC control signal in the present embodiment is explained.

Conventionally, as described previously, the PFC control signal 209 turns on in the normal power mode 502 and turns off in the power-saving mode 503. However, in the present embodiment, in the case where the fax unit 108, which is optional, is installed, in the power-saving mode also, the PFC control signal 209 is turned on. The reason is that in the case where the fax unit 108 is installed, there is a possibility that the power consumption exceeds the maximum acceptable power of the power source unit in the state where the PFC unit 207 is turned off.

Table 2 shows the value (on or off) of the PFC control signal 209 generated by a combination of the mode register 309 and the forced ON register 310, and the power value in each state for reference purposes.

TABLE 2

| Mode register | Forced ON register | PFC control signal | Power value (reference) |
| --- | --- | --- | --- |
| Normal power mode | True | On | Max 1000 W |
| Normal power mode | False | On | Max 1000 W |
| Power-saving mode | True | On | Min 5 W to Max 20 W |
| Power-saving mode | False | Off | Min 0.5 W to Max 10 W |

As described previously, the PFC control signal 209 is determined based on the value of the mode register 309, which indicates the power mode of the multi function printer 101, and the value of the forced ON register 310, which indicates whether or not the optional fax unit 108 is installed. In the case where the PFC unit 207 is off, it is possible for the power source unit 202 to operate up to 10 W. Only in the case where the multi function printer 101 is in the power-saving mode and the optional fax unit 108 is not installed, the maximum power consumption is 10 W, and therefore, it is possible to turn off the PFC control signal 209. On the other hand, in the case where the fax unit 108 is installed though the mode is the power-saving mode, the maximum power consumption is 20 W and there is a possibility that the power consumption exceeds 10 W, and therefore, it is necessary to turn on the PFC control signal. That is, the fax unit 108 means a peripheral device having a possibility of being supplied with power larger than predetermined power.

Figure 6:
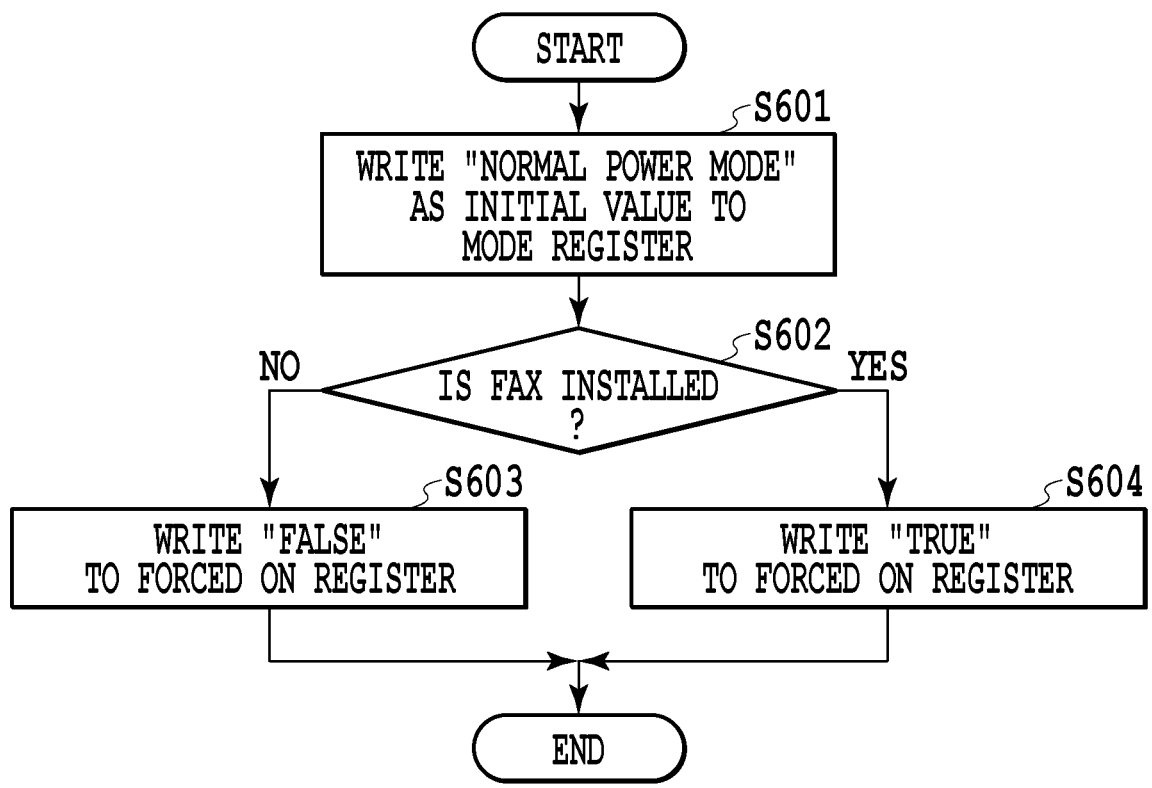
FIG. 6 is a flowchart showing a flow of initialization processing of the multi function printer in the first embodiment.

FIG. 6 is a flowchart showing a flow of initialization processing of the multi function printer 101 in the present embodiment. The initialization processing is initialization processing that is performed by the CPU 301 in response to the power source of the multi function printer 101 being turned on.

In the case where the power source switch 211 of the multi function printer 101 is turned on and a power source is supplied, at step S601, the CPU 301 of the controller unit 104 writes the initial value of the mode register 309 as the normal power mode. The reason is that it is necessary to energize all the units of the multi function printer 101 after the power source is turned on.

At step S602, the CPU 301 determines whether or not the fax unit 108 is installed. That is, the CPU 301 also functions as a device installation determination unit configured to determine whether a peripheral device, such as the fax unit 108, which has a possibility of being supplied with power larger than predetermined power is installed. Specifically, the CPU 301 transmits an initialization command to the fax unit 108 via the engine I/F 304 and determines whether or not there is a response from the fax unit 108. In the case where a response cannot be detected, the processing advances to step S603 and the CPU 301 writes False to the forced ON register 310. On the other hand, in the case where a response can be detected, the processing advances to step S604 and the CPU 301 writes True to the forced ON register 310. As described above, in the case where the power source is turned on in the multi function printer 101, the CPU 301 sets the value of the mode register 309 to the normal power mode and stores the value and in accordance with whether or not the fax unit 108 is installed, the CPU 301 sets the value of the forced ON register and stores the value. As shown in Table 2, irrespective of the value of the forced ON register 310, in the initialization processing by the CPU 301, the PFC control signal 209 turns on.

Figure 7:
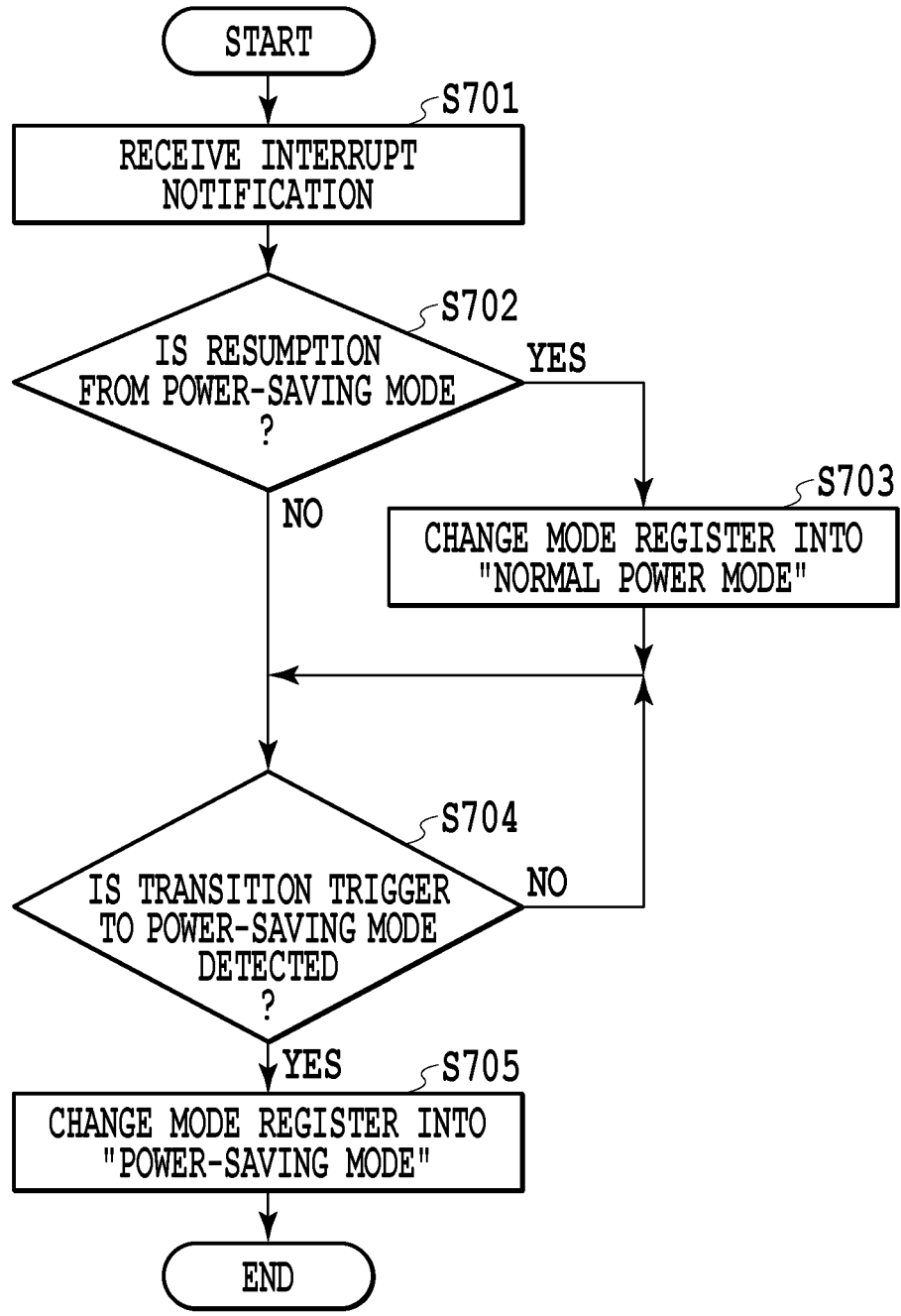
FIG. 7 is a flowchart showing a flow of power mode change processing in the first embodiment.

FIG. 7 is a flowchart showing a flow of power mode change processing in the present embodiment. The processing shown in FIG. 7 is performed by the CPU 301 after completion of the initialization processing or at the time of resumption from the power-saving mode.

At step S701, the CPU 301 receives an interrupt notification from the interrupt control unit 306.

At step S702, the CPU 301 refers to the mode register 309 and determines whether the resumption is from the power-saving mode. That is, in the case where the current value of the mode register 309 is the power-saving mode, the resumption is from the power-saving mode, and therefore, the processing advances to step S703 and the CPU 301 changes the value of the mode register 309 into the normal power mode. On the other hand, in the case where the current value of the mode register 309 is already the normal power mode and the resumption is not from the power-saving mode, it is not necessary to change the mode register 309.

At step S704, the CPU 301 determines whether or not a transition trigger to the power-saving mode is detected. The transition trigger to the power-saving mode is, as described previously, completion of processing of a job, or an elapse of a predetermined time from the last operation at the operation unit 105. In the case where the transition trigger is detected, the processing advances to step S705, and the CPU 301 changes the mode register 309 into the power-saving mode and the present processing is terminated. On the other hand, in the case where no transition trigger is detected, at step S704, trigger detection is continued until a transition trigger is detected.

Figure 8:
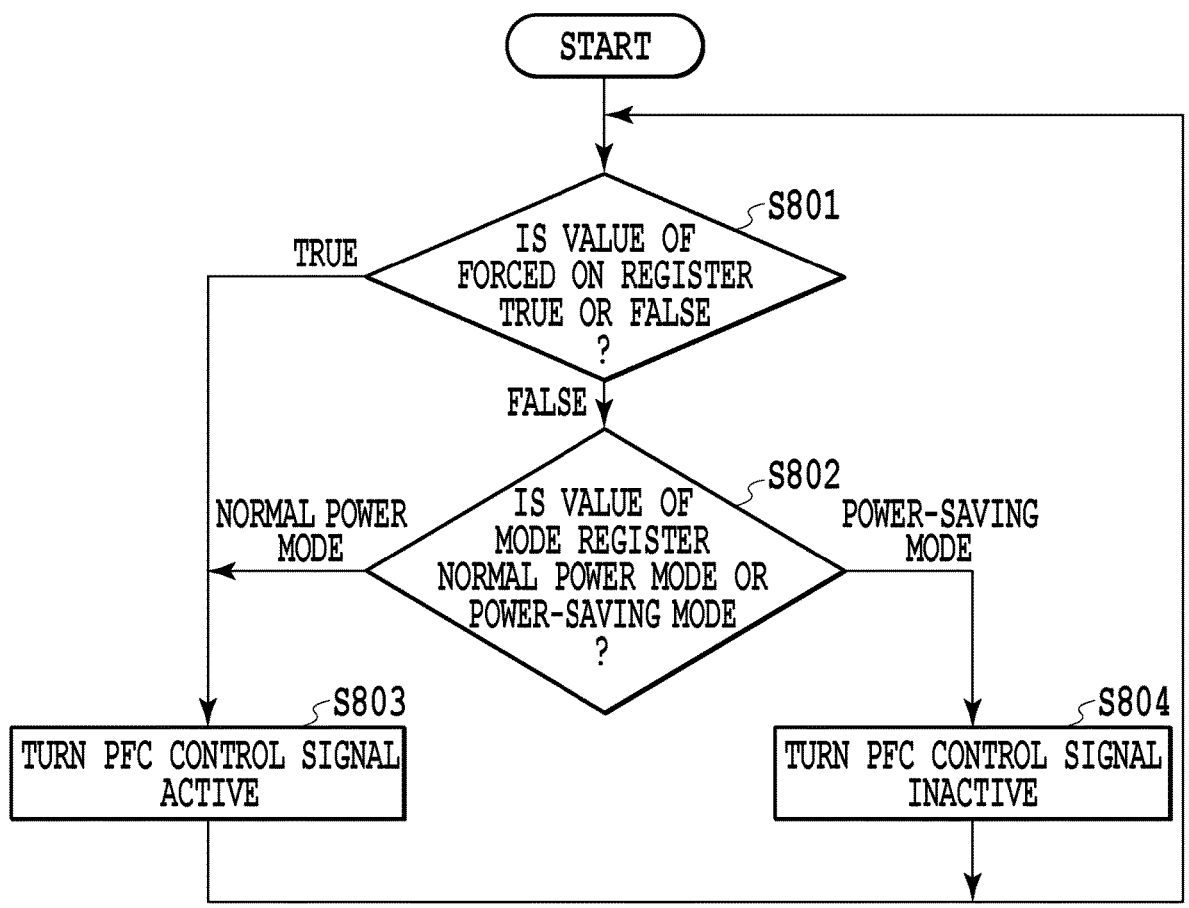
FIG. 8 is a flowchart showing a flow of control processing of a PFC control signal in the first embodiment.

FIG. 8 is a flowchart showing a flow of control processing of the PFC control signal 209 in the present embodiment. The processing shown in FIG. 8 is performed by the power source control unit 201 and the on/off control of the PFC control signal 209 described previously with reference to Table 2 is implemented. That is, the processing is a control method to control the operation of the PFC circuit in the present embodiment.

At step S801, the power source control unit 201 determines whether the value of the forced ON register 310 is True or False. In the case where the forced ON register 310 is True, the fax unit 108 is installed, and therefore, the processing advances to step S803 and the power source control unit 201 turns the PFC control signal 209 active. That is, the power source control unit 201 turns on the PFC control signal 209. On the other hand, in the case where the forced ON register 310 is False, the processing advances to step S802.

At step S802, the power source control unit 201 determines whether the value of the mode register 309 is the normal power mode or the power-saving mode. In the case where the value of the mode register 309 is the normal power mode, the processing advances to step S803 and the power source control unit 201 turns the PFC control signal 209 active. That is, the power source control unit 201 turns on the PFC control signal 209. On the other hand, in the case where the value of the mode register 309 is the power-saving mode, the processing advances to step S804 and the power source control unit 201 turns the PFC control signal 209 inactive. That is, the power source control unit 201 turns off the PFC control signal 209. The power source control unit 201 controls the PFC control signal 209 by repeating the processing at step S801 to step S804.

As explained above, in the present embodiment, the value of the mode register 309, which indicates the power mode, and the value of the forced ON register 310, which indicates whether or not the optional fax unit 108 is installed, are set and stored. It is possible for the power source control unit 201 to optimally control the PFC control signal 209 in the power-saving mode based on the setting values stored in the mode register 309 and the forced ON register 310. That is, in the case where the fax unit 108 is installed, there is a possibility that a bad effect or the like due to the harmonic components appears remarkably in the power source unit 202, and therefore, the PFC unit 207 is turned on also in the power-saving mode. On the other hand, in the case where the fax unit 108 is not installed, it is possible to reduce power consumption by turning off the PFC unit 207. As described above, in the present embodiment, it is made possible to control the operation of the PFC unit 207 in accordance with the configuration of peripheral devices, such as the fax unit 108.

Second Embodiment

In the first embodiment, the example is explained in which on/off of the PFC unit 207 is switched depending on whether or not the fax unit 108 is installed. In the present embodiment, an example is explained in which on/off of the PFC unit 207 is switched in accordance with the model type of the multi function printer 101.

In the present embodiment, the configuration of the controller unit 104 is common to model type A and model type B. On the other hand, the configuration of peripheral devices is different between model type A and model type B and there is a difference in that the fax unit 108 is not installed in model type A but the fax unit 108 is installed in model type B as a standard configuration. Consequently, it may be possible to turn off the PFC unit 207 in the power-saving mode in model type A but it is necessary to turn on the PFC unit 207 also in the power-saving mode in model type B.

Figure 9:
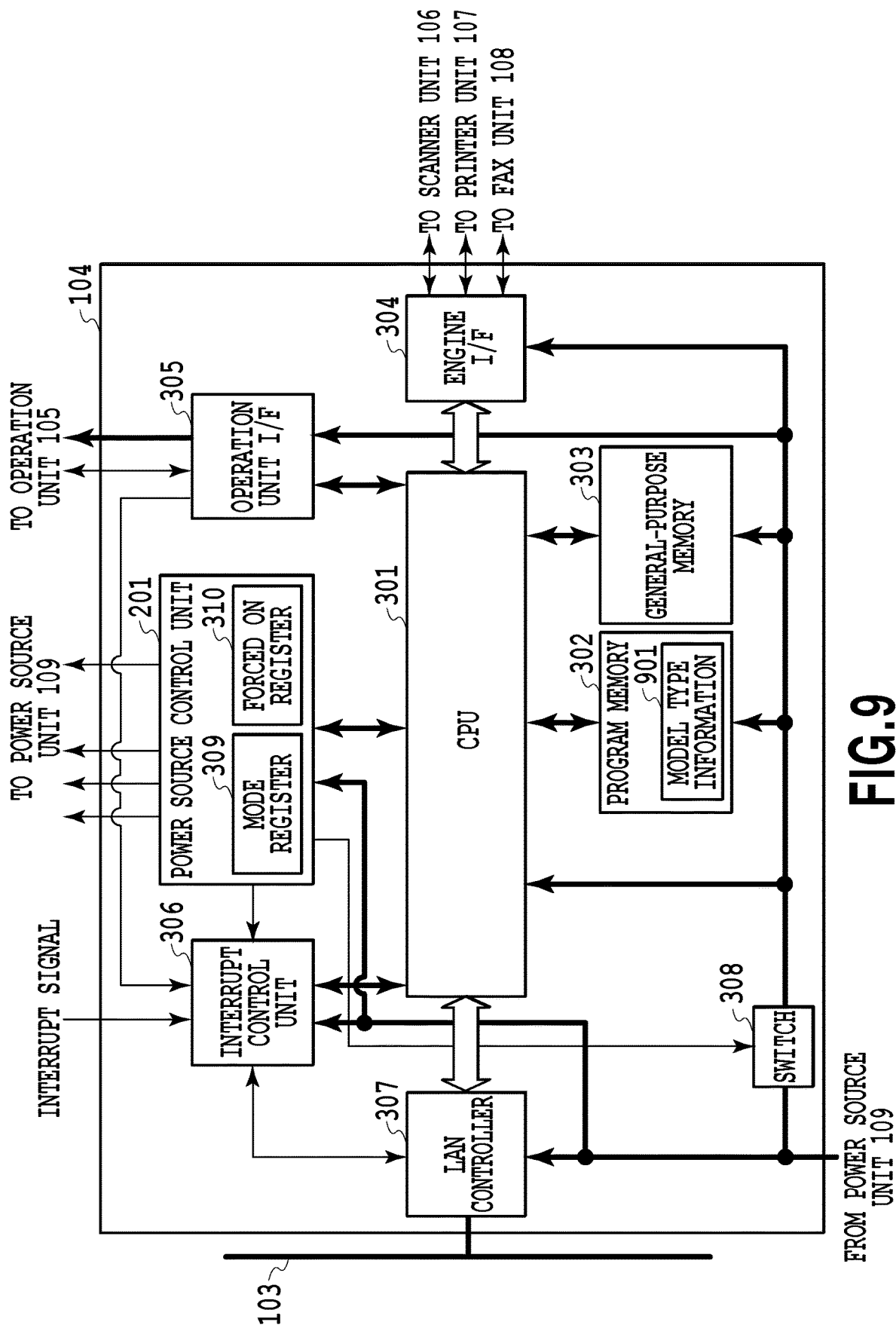
FIG. 9 is a block diagram showing a configuration of a controller unit in a multi function printer of a second embodiment.

FIG. 9 is a block diagram showing a configuration of the controller unit 104 in the second embodiment. The configuration of the controller unit 104 shown in FIG. 9 is substantially the same as the configuration shown in FIG. 3 of the first embodiment but a difference lies in that a program that is stored in the program memory 302 includes model type information 901.

In the program memory 302 of model type A, a value indicating model type A is stored as the model type information 901. On the other hand, in the program memory 302 of model type B, a value indicating model type B is stored as the model type information 901. The CPU 301 of the controller unit 104 in the present embodiment refers to the model type information 901 at the time of initialization processing.

Figure 10:
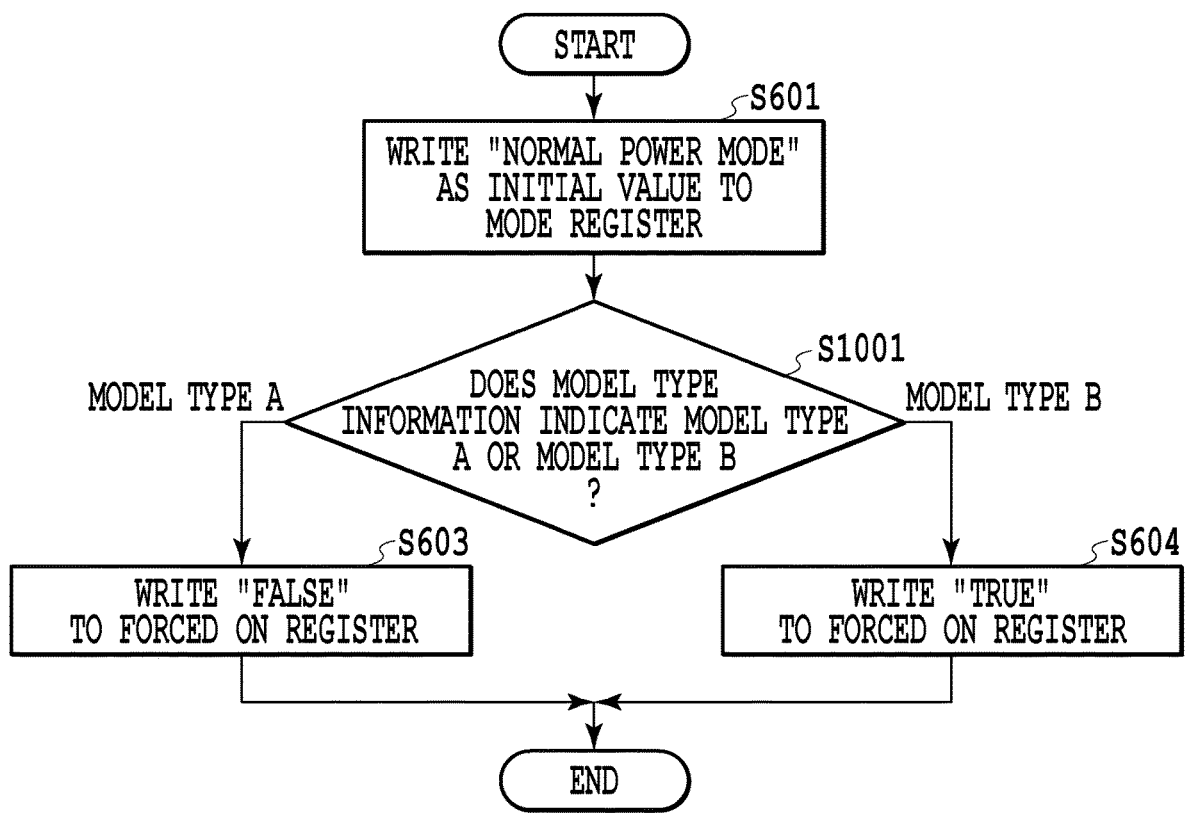
FIG. 10 is a flowchart showing a flow of initialization processing of the multi function printer in the second embodiment.

FIG. 10 is a flowchart showing a flow of initialization processing of the multi function printer 101 in the second embodiment. By a comparison, the flowchart shown in FIG. 10 differs from the flowchart shown in FIG. 6 of the first embodiment in that the CPU 301 refers to the model type information 901 within the program memory 302 at step S1001 and performs determination after writing the initial value of the mode register 309 at step S601. That is, in the present embodiment, the CPU 301 also functions as a model type determination unit configured to determine the model type of the apparatus in accordance with the model type information 901.

In the case where it is determined that the model type information 901 within the program memory 302 indicates model type A at step S1001, the processing advances to step S603 and the CPU 301 writes False to the forced ON register 310. On the other hand, in the case where it is determined that the model type information 901 indicates model type B, the processing advances to step S604 and the CPU 301 writes True to the forced ON register 310.

As explained above, in the present embodiment, it is possible to determine the difference in the configuration due to the model type, that is, whether or not the fax unit 108 is installed by the model type information 901 and to optimally control the PFC control signal 209 in the power-saving mode as in the first embodiment. Specifically, in model type B in which the fax unit 108 is installed, there is a possibility that a bad effect or the like due to the harmonic components appears remarkably in the power source unit 202, and therefore, the PFC unit 207 is turned on also in the power-saving mode. On the other hand, in model type A in which the fax unit 108 is not installed, it is possible to reduce power consumption by turning off the PFC unit 207.

Further, as shown in Table 3 below, it may also be possible to store information indicating whether or not the fax unit is installed in the program memory 302, in addition to the model type information specifying the model type. It may also be possible for the CPU 301 to control the forced ON register by referring to the information indicating whether or not the fax unit is installed as well as the model type information at the time of performing initialization processing.

TABLE 3

| Model type information | Whether or not fax unit is installed |
| --- | --- |
| model type A | fax unit is not installed |
| model type B | fax unit is installed |

That is, in the case where the model type information indicates model type A, it is possible for the CPU 301 to determine that the fax unit is not installed by referring to Table 3, and therefore, the CPU 301 writes False to the forced ON register 310. On the other hand, in the case where the model type information indicates model type B, it is possible for the CPU 301 to determine that the fax unit is installed by referring to Table 3, and therefore, the CPU 301 writes True to the forced ON register 310.

As explained above, it may also be possible to store information indicating whether or not the fax unit is installed, in addition to the model type information specifying the model type and to switch on/off of the PFC unit 207 by referring thereto.

Third Embodiment

In the present embodiment, an example is explained in which on/off of the PFC unit 207 is switched in a configuration in which it is possible to set the function of the fax unit 108 active or inactive in the multi function printer 101 installing the fax unit 108 as a standard configuration.

The multi function printer 101 in the present embodiment installs the fax unit 108 as a standard configuration and is caused to have a configuration in which it is made possible for a user who does not use the fax unit 108 to switch the function of the fax unit 108 between active and inactive. In the multi function printer 101 in which the fax unit 108 is set inactive, the fax unit 108 is not energized. Consequently, in the case where the fax unit 108 is set inactive, it is possible to turn off the PFC unit 207. On the other hand, in the case where the fax unit 108 is set active, it is necessary to turn on the PFC unit 207.

Figure 11:
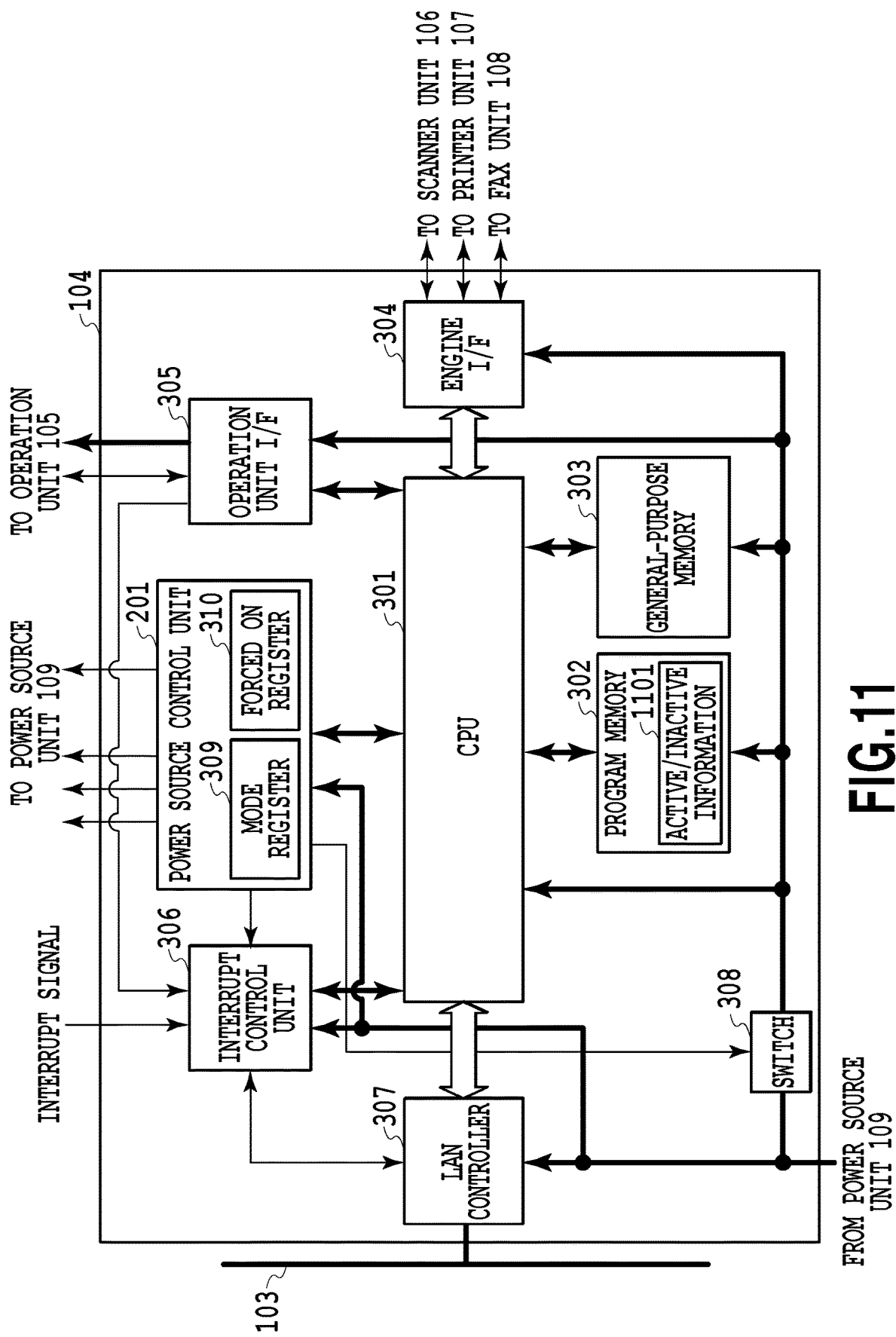
FIG. 11 is a block diagram showing a configuration of a controller unit in a multi function printer of a third embodiment.

FIG. 11 is a block diagram showing a configuration of the controller unit 104 in the third embodiment. The configuration of the controller unit 104 shown in FIG. 11 is substantially the same as the configuration shown in FIG. 3 of the first embodiment, but a difference lies in that a program that is stored in the program memory 302 includes setting information 1101 indicating whether the fax unit 108 is active or inactive. It is possible for a user to switch between active and inactive of the setting information 1101 indicating whether the function of the fax unit 108 is active or inactive by operating a menu on the operation unit 105. Further, it is also possible for a user to switch between active and inactive by operating the PC 102 via the network 103. The program memory 302 in which the setting information 1101 is stored is nonvolatile and the setting information 1101 is retained even in the case where the power source of the multi function printer 101 is shut off. The CPU 301 of the controller unit 104 refers to the setting information 1101 indicating active or inactive at the time of initialization processing. In the case where a user changes the setting after the initialization, the setting information 1101 indicating active or inactive is changed, but the changed setting information 1101 is reflected in the multi function printer 101 at the time of initialization of the controller unit 104 after restart.

Figure 12:
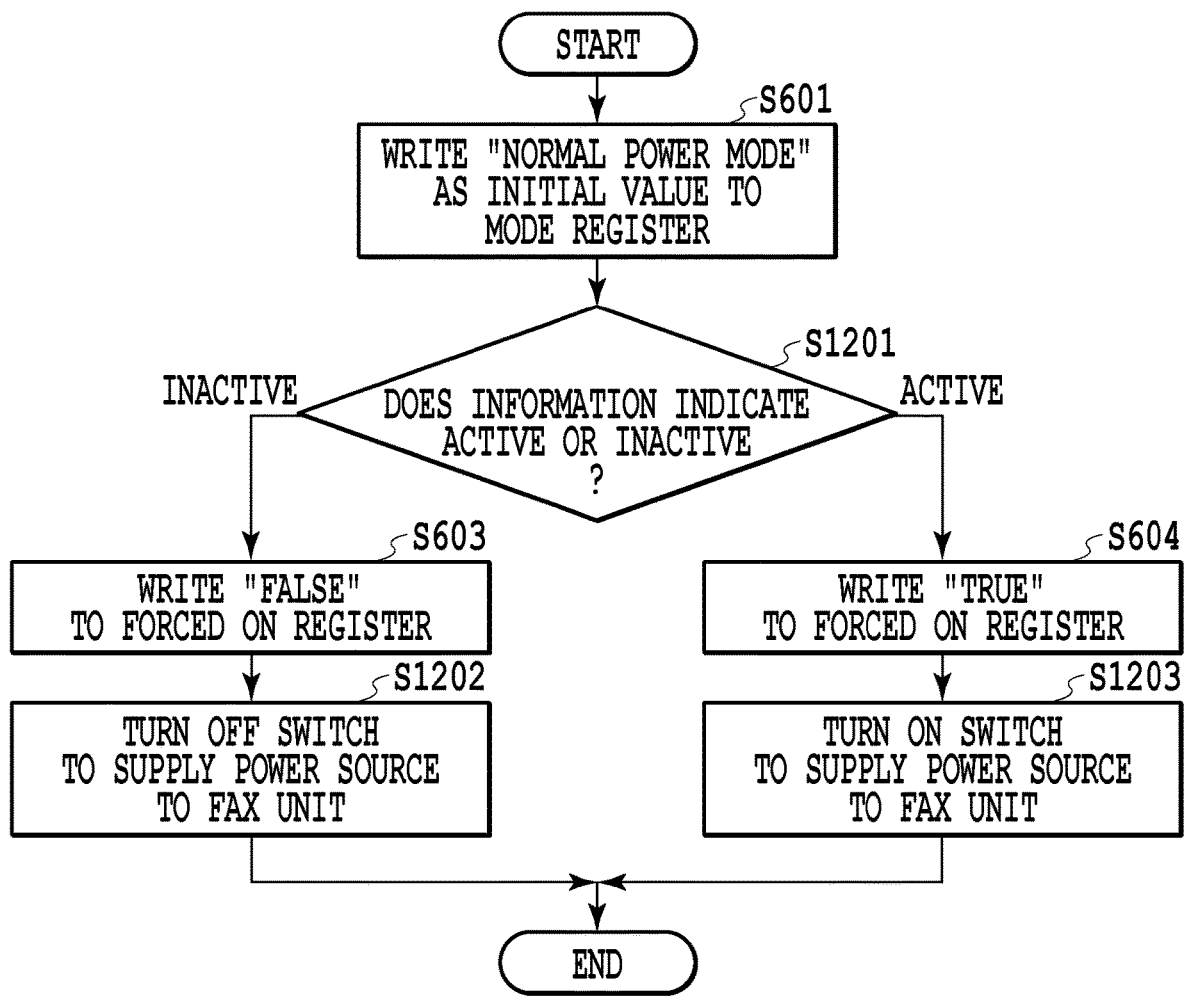
FIG. 12 is a flowchart showing a flow of initialization processing of the multi function printer in the third embodiment.

FIG. 12 is a flowchart showing a flow of initialization processing of the multi function printer 101 in the third embodiment. Compared with FIG. 6 of the first embodiment, the flowchart shown in FIG. 12 differs in that the CPU 301 refers to the setting information 1101 indicating active or inactive within the program memory 302 and performs determination at step S1201 after writing the initial value of the mode register 309 at step S601. That is, in the present embodiment, the CPU 301 includes a function determination unit configured to determine whether the function of the fax unit 108 is active. Further, the flowchart shown in FIG. 12 differs also in that on/off of the switch 205 that supplies a power source to the fax unit 108 is switched at step S1202 and step S1203.

In the case where it is determined that the setting information 1101 indicating active or inactive is inactive at step S1201, the processing advances to step S603 and the CPU 301 writes False to the forced ON register 310. Next, at step S1202, the CPU 301 turns off the switch 205 via the power source control unit 201 and shuts off the power source supply to the fax unit 108.

On the other hand, in the case where it is determined that the setting information 1101 indicating active or inactive is active at step S1201, the processing advances to step S604 and the CPU 301 writes True to the forced ON register 310. Next, at step S1203, the CPU 301 turns on the switch 205 via the power source control unit 201 and supplies a power source to the fax unit 108.

As explained above, in the present embodiment, whether or not to supply power to the fax unit 108 is determined according to the setting information 1101 indicating whether the function of the fax unit 108 is active or inactive. By doing so, it is possible to optimally control the PFC control signal 209 in the power-saving mode as in the first embodiment. That is, in the case where the function of the fax unit 108 is set active, there is a possibility that a bad effect or the like due to the harmonic components appears remarkably in the power source unit 202, and therefore, the PFC unit 207 is turned on also in the power-saving mode. On the other hand, in the case where the function of the fax unit 108 is set inactive and no power source is supplied to the fax unit 108, it is possible to reduce power consumption by turning off the PFC unit 207.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

According to the present invention, in an apparatus capable of operating in the power-saving mode, it is possible to control the operation of the PFC circuit in accordance with the configuration of peripheral devices.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-217978 filed Nov. 8, 2016, which is hereby incorporated by reference wherein in its entirety.

What is claimed is:

1. An information processing apparatus capable of operating in a predetermined power-saving mode, the apparatus comprising:
   a converter that converts input AC (alternating current) power into DC (direct current) power and includes a power factor correction (PFC) circuit to output power with a corrected power factor;
   a storage device that stores information indicating a model type of the information processing apparatus; and
   a power controller that outputs a PFC control signal to the PFC circuit based on the information stored in the storage device,
   wherein the PFC circuit outputs power with the corrected power factor when the PFC control signal is input and the PFC circuit outputs power with an uncorrected power factor when the PFC control signal is not input.

2. The information processing apparatus according to claim 1, further comprising a processor and a memory used as a work area for the processor,
   wherein the memory operates in a self-refresh mode in the predetermined power-saving mode.

3. The information processing apparatus according to claim 2, further comprising:
   an interface capable of connecting to a specific device included in the information processing apparatus,
   wherein the specific device connected to the interface is supplied with power in the predetermined power-saving mode.

4. The information processing apparatus according to claim 3, wherein the specific device is a fax machine.

5. The information processing apparatus according to claim 1, further comprising a processor configured (i) to determine whether the information stored in the storage device indicates a model type of an information processing apparatus that includes a specific device, and (ii) to set a setting value that outputs the PFC control signal to the PFC circuit while the information processing apparatus operates in at least the predetermined power-saving mode,
   wherein the power controller outputs the PFC control signal to the PFC circuit based on the setting value while the information processing apparatus operates in at least the predetermined power-saving mode.

6. The information processing apparatus according to claim 1, further comprising a printer to which no power is supplied in a case where the information processing apparatus operates in the predetermined power-saving mode.

7. The information processing apparatus according to claim 1, wherein the power controller outputs the PFC control signal to the PFC circuit in a case where the information stored in the storage device indicates a model type of an information processing apparatus not including a specific device.

8. The information processing apparatus according to claim 1, wherein the power controller is capable of outputting the PFC control signal to the PFC circuit when the information processing apparatus operates in the predetermined power-saving mode if the information stored in the storage device indicates a model type of an information processing apparatus that does not include a specific device, and is configured to not output the PFC control signal to the PFC circuit when the information processing apparatus is in the predetermined power-saving mode if the information stored in the storage device indicates a model type of an information processing apparatus that includes the specific device.

9. The information processing apparatus according to claim 1, wherein the power controller is capable of outputting the PFC control signal to the PFC circuit, so that the DC power converted from the input AC power is supplied from the converter without correcting a power factor about the AC power by the PFC circuit while the information processing apparatus operates in the predetermined power-saving mode.

10. The information processing apparatus according to claim 1, wherein the PFC circuit is configured to correct a power factor about the AC power while the PFC circuit is on, and not to correct the power factor about the AC power while the PFC circuit is off.

11. A control method of an information processing apparatus capable of operating in a predetermined power-saving mode, the apparatus comprising a converter that converts input AC (alternating current) power into DC (direct current) power and includes a power factor correction (PFC) circuit to output power with a corrected power factor, a storage device that stores information indicating a model type of the information processing apparatus, and a power controller that outputs a PFC control signal to the PFC circuit based on the information stored in the storage device, the method comprising the steps of:
   outputting, by the PFC circuit, power with the corrected power factor when the PFC control signal is input; and
   outputting, by the PFC circuit, power with an uncorrected power factor when the PFC control signal is not input.

12. The control method of an information processing apparatus according to claim 11, wherein the information processing apparatus can transit to the predetermined power-saving mode.

13. The control method of an information processing apparatus according to claim 12, wherein the information processing apparatus comprises an interface capable of connecting to a specific device included in the information processing apparatus, and
   wherein the specific device connected to the interface is supplied with power in the predetermined power-saving mode.

14. The control method of an information processing apparatus according to claim 13, wherein the specific device is a fax machine.

15. An information processing apparatus capable of operating in a predetermined power-saving mode, the apparatus comprising:
   a converter that converts input AC (alternating current) power into DC (direct current) power, and includes a power factor correction (PFC) circuit to output power with a corrected power factor;
   a memory configured to store information indicating a model type of the information processing apparatus; and a power controller that outputs a PFC control signal to the PFC circuit based on the information stored in the memory,
wherein the PFC circuit outputs power with the corrected power factor when the PFC control signal is input and the PFC circuit outputs power with an uncorrected power factor when the PFC control signal is not input.

16. The information processing apparatus according to claim 15, further comprising a processor configured to cause the power controller to output the PFC control signal to the PFC circuit so that the DC power is supplied to at least one device included in the information processing apparatus in a state in which the power controller outputs the PFC control signal to the PFC circuit in the predetermined power-saving mode based on at least whether or not the model type indicated by the information stored in the memory indicates a model type where the at least one device includes a specific device.

17. The information processing apparatus according to claim 16, wherein the processor is configured to set information for outputting the PFC control signal to the PFC circuit in the power controller, and
wherein the power controller is configured to output the PFC control signal to the PFC circuit based on the set information.

18. The information processing apparatus according to claim 15, wherein the power controller is capable of outputting the PFC control signal to the PFC circuit to cause the predetermined power-saving mode in which the PFC circuit is off on a condition that the model type indicated by the information stored in the memory does not indicate the model type where at least one device included in the information processing apparatus includes a specific device.

19. The information processing apparatus according to claim 15, wherein a power consumption in the predetermined power-saving mode of the model type where at least one device included in the information processing apparatus includes a specific device is larger than that of a model type where the at least one device does not include the specific device.

* * * * *